(No Model.) 2 Sheets—Sheet 1.

E. A. MARSH.
BELT STARTING AND STOPPING MECHANISM.

No. 510,694. Patented Dec. 12, 1893.

WITNESSES:
A. D. Harrison
W. F. McLeod

INVENTOR:
E. A. Marsh
by
Wright H Brown Crosley
Attys.

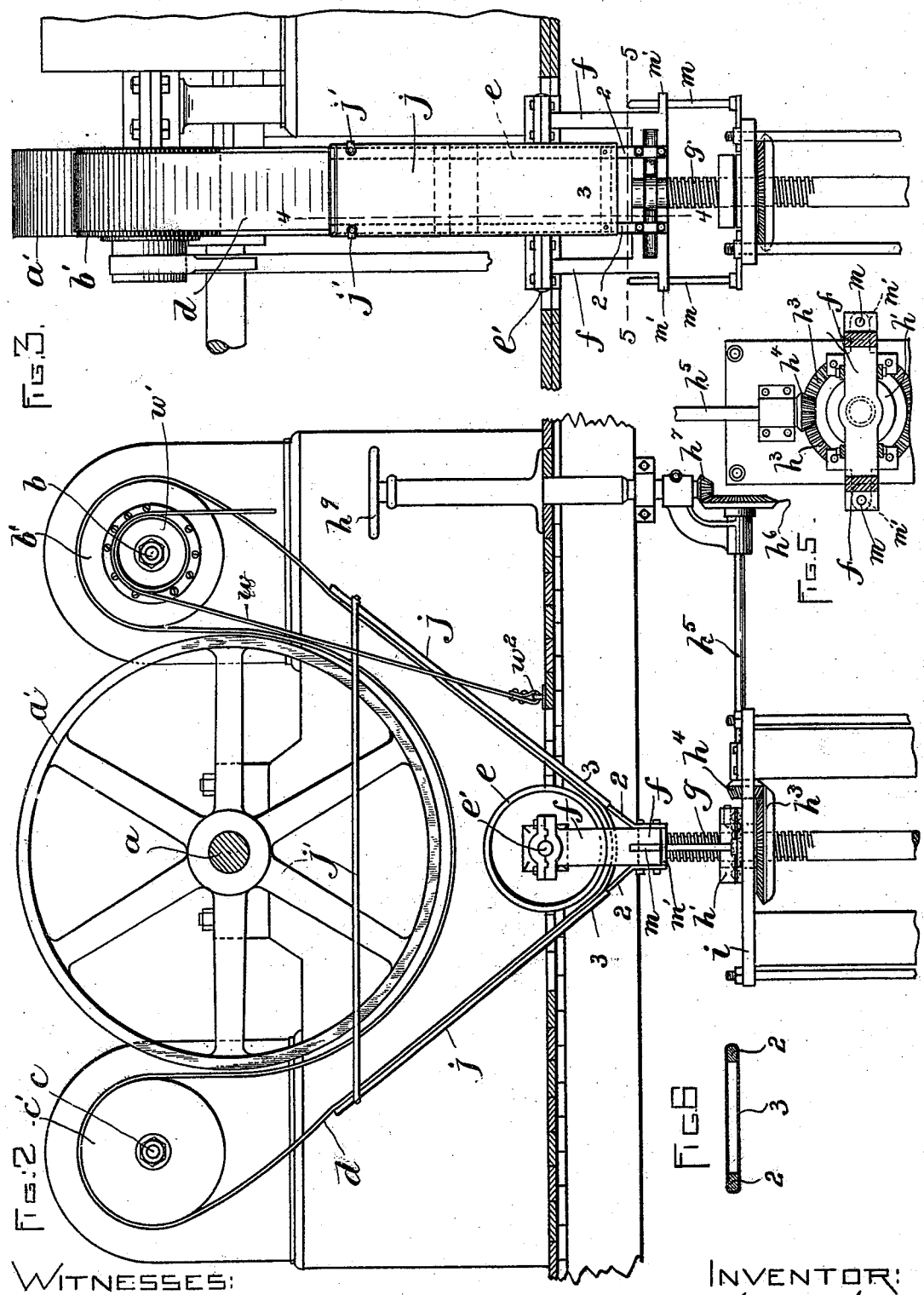

UNITED STATES PATENT OFFICE.

EDWARD A. MARSH, OF NEWTON, MASSACHUSETTS.

BELT STARTING AND STOPPING MECHANISM.

SPECIFICATION forming part of Letters Patent No. 510,694, dated December 12, 1893.

Application filed July 22, 1893. Serial No. 481,191. (No model.)

*To all whom it may concern:*

Be it known that I, EDWARD A. MARSH, of Newton, in the county of Middlesex and State of Massachusetts, have invented certain new and useful Improvements in Belt Stopping and Starting Mechanism, of which the following is a specification.

This invention has for its object to provide means for readily stopping and starting the motion of a belt which communicates power from a driving-shaft to two or more driven shafts, and is particularly applicable to electric lighting plants, where it is desirable to locate the dynamo machine as near the source of power as the existing conditions will allow.

My invention comprises the improvements hereinafter described and claimed, whereby the driving-belt communicating motion to a plurality of shafts in close proximity to the driving-shaft may be readily controlled and stopped and started at will.

Figure 1:
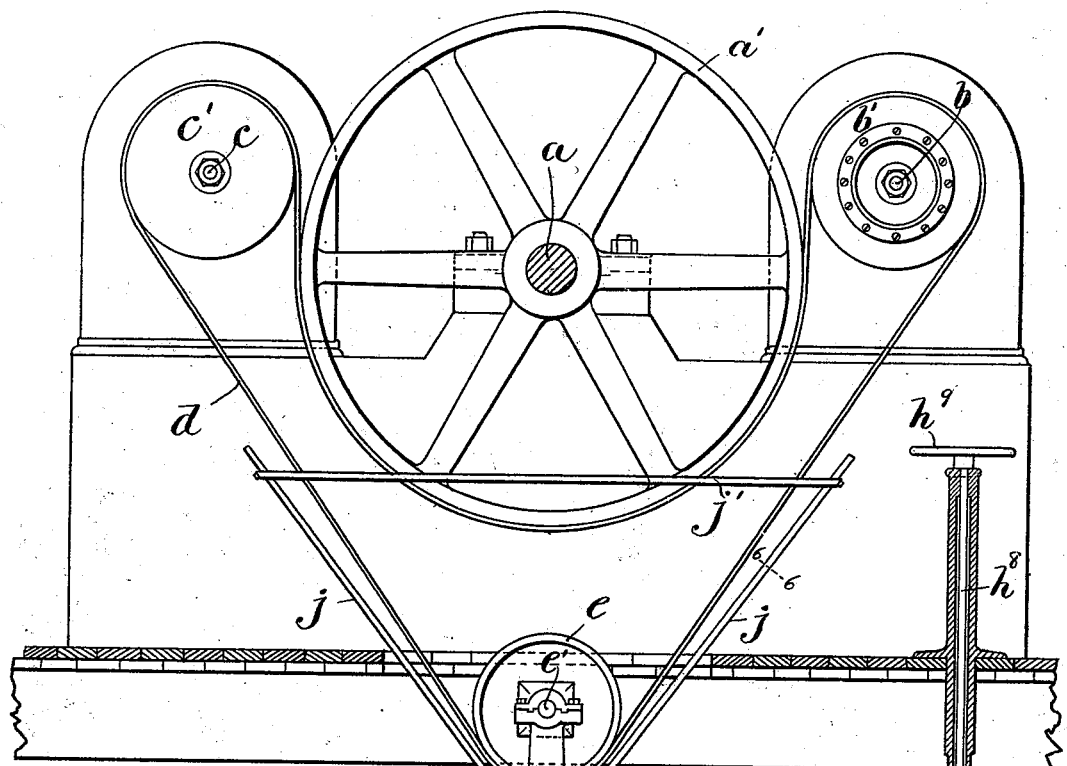
Figure 4:
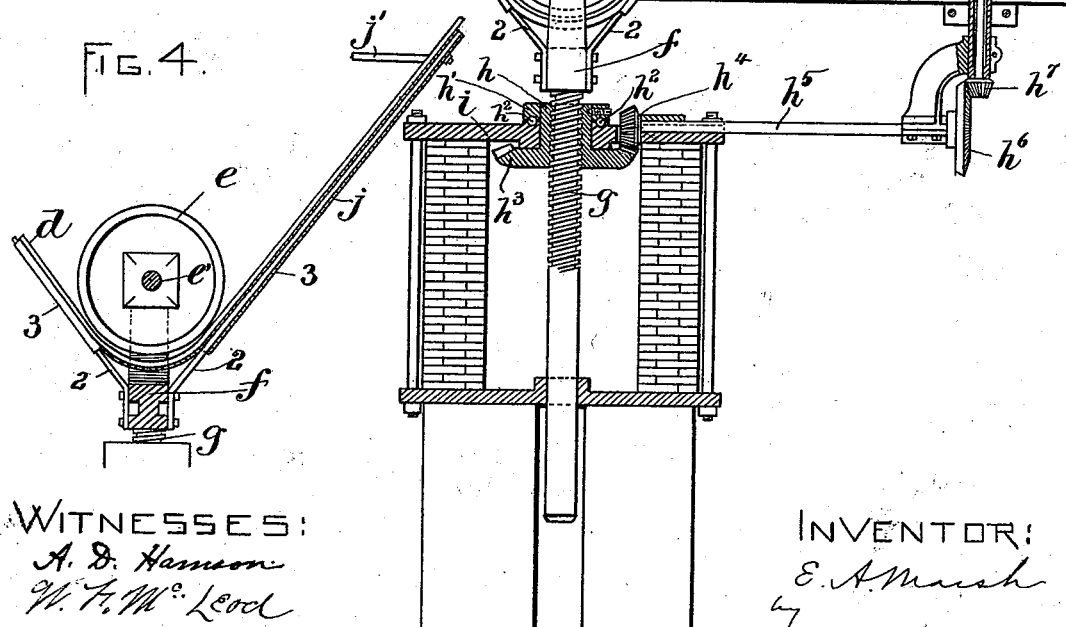

Of the accompanying drawings, forming part of this specification: Figure 1 represents an elevation, showing a driving-shaft and two driven shafts connected by a belt, and belt starting and stopping mechanism embodying my invention arranged to control said belt, the belt being shown in its operative position. Fig. 2 represents a view similar to Fig. 1, showing the belt made inoperative. Fig. 3 represents an edge view of the mechanism shown in Fig. 2. Fig. 4 represents a section on line 4—4 of Fig. 3. Fig. 5 represents a section on line 5—5 of Fig. 3. Fig. 6 represents a section on line 6—6 of Fig. 1.

The same letters and numerals of reference indicate the same parts in all the figures.

In the drawings: $a$ represents a driving-shaft, on which is a driving-wheel or pulley $a'$.

$b$ $c$ represent driven shafts, provided respectively with pulleys $b'$ and $c'$, and located at opposite sides of and parallel with the driving-shaft $a$. In the present instance, the shafts $b$ $c$ may be considered the shafts which drive the armatures of dynamo electric machines.

$d$ represents a driving-belt, which passes under the driving-pulley $a'$ and over the pulleys $b'$ $c'$, and extends downwardly from said pulleys, forming a bight, which passes under an idle-pulley $e$. The shaft $e'$ of said idle-pulley is journaled in bearings in a vertically-movable frame $f$, to which is affixed a vertical screw $g$, projecting downwardly from the frame. Said screw is engaged with a nut $h$, which is fitted to rotate in a bearing formed in a fixed supporting-frame or bed $i$, said nut being circular, and provided at its upper end with a flange $h'$ rigidly affixed to it and projecting over the bed $i$, said flange causing the bed to support the weight of the nut. The rotation of the nut may be facilitated by anti-friction rollers or balls $h^2$ (Fig. 1), interposed between the flange $h'$ and the bed $i$. On the lower end of the nut $h$ is formed a bevel-gear $h^3$, which meshes with a bevel-gear $h^4$, affixed to a horizontal shaft $h^5$, which is journaled in fixed bearings, and has at one end a bevel-gear $h^6$, meshing with a bevel-gear $h^7$ on a vertical shaft $h^8$. The last-named shaft has a hand-wheel or other operating device $h^9$ at its upper end, which is located in a convenient position to be manipulated by an operator.

$j$ $j$ represent parts of what I denominate a belt-supporting apron, affixed to the frame $f$, said apron being composed of the parts or side-pieces $j$ $j$, and the connecting-rods $j'$ $j'$ which connect the upper ends of the side-pieces, the lower ends of said side-pieces being rigidly affixed to the frame $f$. The side-pieces $j$ $j$ are oppositely inclined, as shown, so that the apron is practically V-shaped; and, as the side-pieces are below the bight of the belt which runs under the pulley $e$, said apron is adapted, when the frame $f$ is raised, as hereinafter described, to raise the bight of the belt and thus slacken that portion of the belt which passes under the driving-pulley $a'$.

When it is desired to make the belt operative, the nut $h$ is turned to depress the frame $f$, and the pulley and apron supported thereby, the pulley $e$ being thus caused to tighten the belt, as shown in Fig. 1, thus causing the belt to operatively connect the driving-pulley $a'$ and the driven pulleys $b'$ $c'$. When it is desired to stop the rotation of the pulleys $b'$ $c'$, the frame $f$ is raised by a suitable rotation of the nut, this movement of the frame raising the pulley $e$ from the belt and at the same time causing the apron to raise the bight of the belt and thus slacken the portion thereof that extends under the pulley $a'$.

It will be observed that the above described improvement enables the dynamo machines operated by the shafts $b\ c$ to be located very near the source of power, and permits safe access to said machines at all times, both of these results being very desirable. It will also be seen that my invention secures sufficient belt-contact on both the driving and driven pulleys, and permits the driving of two machines with a single belt, so that the whole arrangement is compact and effective. The extended belt-contact obviates the necessity of extreme pressure between the driving and driven surfaces, which pressure is necessary when the surfaces in frictional contact are more limited, and is objectionable because it causes the heating of the bearings to a very material extent.

The frame $f$ is prevented from turning with the nut by fixed guide-rods $m\ m$, secured to the plate $i$ and passing through perforated ears $m'\ m'$ on the frame. I prefer to make each of the side-pieces $j\ j$ of stout rods 2 2, bolted to the frame $f$, and sheet-metal coverings 3 on said rods.

I do not limit myself to the details of construction hereinbefore described, as the same may be variously modified without departing from the spirit of the invention.

$w$ represents a band-brake, affixed at $w^2$ to a rigid support and passing over a pulley $w'$ on the shaft $b$, one end being free, so that the brake may be grasped by the operator and caused to stop the rotation of the shaft $b$ when the driving-belt is made inoperative.

It has been found that, after the belt has been slackened as shown in Fig. 2, the loose bight next the pulley is liable to oscillate, and thus come in contact with the driving-pulley and continue to receive motion therefrom, so that the stoppage of the rotation of the driven shafts is liable to take too much time, unless some means are employed to prevent the said contact of the belt with the driving-pulley and the resulting accidental propulsion of the belt. The brake $w$ accomplishes this purpose by stopping and holding the pulley $b'$, the belt being prevented from moving progressively by said pulley. I have found that the loose bight of the belt immediately comes to rest after the stoppage of the motion of the pulley $b'$, and that after coming to rest said bight does not bear on the driving-pulley at any point, so that the belt cannot accidentally receive motion therefrom. It is not necessary, therefore, to continue to hold the pulley $b'$, after the belt has come to rest.

I claim—

1. The combination of a driving-pulley, a plurality of driven pulleys adjacent thereto, an idle-pulley movable toward and from the driving-pulley and arranged to bear on the upper side of a belt disposed as shown, a belt-supporting apron movable with said idle-pulley and arranged to bear on the under side of said belt, and means for adjusting said idle-pulley and apron, as set forth.

2. The combination of a driving-pulley; two driven pulleys, one located at one side and the other at the opposite side of the driving-pulley; a movable frame located below the driving-pulley; an idle-pulley, a belt-supporting apron, and a downwardly-projecting screw, all located on said frame; a nut engaged with said screw and fitted to rotate in a fixed bearing; and means for rotating said nut; as set forth.

3. The combination of a driving-pulley, a plurality of driven pulleys adjacent thereto, an idle-pulley movable toward and from the driving-pulley and arranged to bear on the upper side of a belt disposed as shown, a belt-supporting apron movable with said idle-pulley and arranged to bear on the under side of said belt, means for adjusting said idle-pulley and apron whereby the belt may be caused to fall away from the driving-pulley, and means for quickly stopping the rotation of one of said pulleys and thereby preventing the accidental propulsion of the belt by the driving-pulley, as set forth.

In testimony whereof I have signed my name to this specification, in the presence of two subscribing witnesses, this 17th day of July, A. D. 1893.

EDWARD A. MARSH.

Witnesses:
C. F. BROWN,
A. D. HARRISON.